Nov. 4, 1969  D. R. SCHNEEBERGER ET AL  3,476,472

STRIP RETRIEVAL DEVICE

Filed Feb. 26, 1968  6 Sheets-Sheet 1

DONALD R. SCHNEEBERGER
LEONARD J. SEABERG
INVENTORS

BY R. Frank Smith
Lloyd F. Seebach
ATTORNEY & AGENT

Nov. 4, 1969          D. R. SCHNEEBERGER ETAL          3,476,472
                          STRIP RETRIEVAL DEVICE
Filed Feb. 26, 1968                                    6 Sheets-Sheet 2
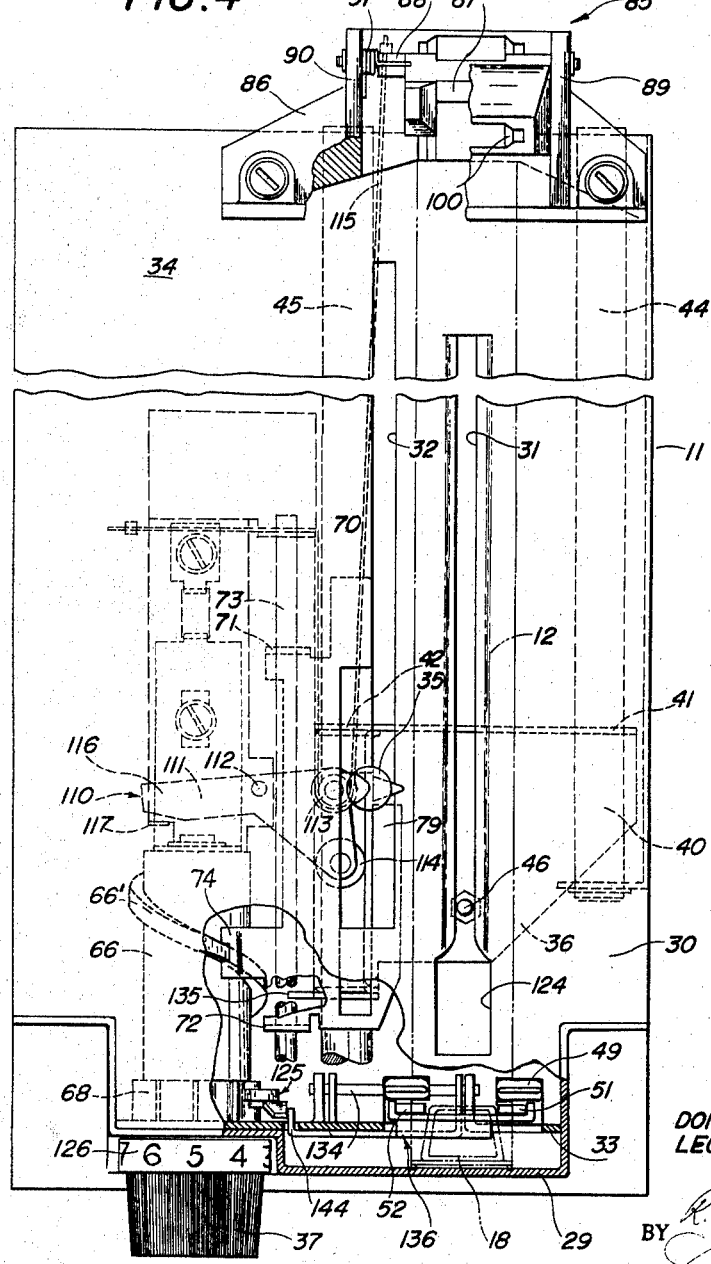
DONALD R. SCHNEEBERGER
LEONARD J. SEABERG
       INVENTORS
BY R. Frank Smith
   Lloyd F. Seebach
   ATTORNEY & AGENT

DONALD R. SCHNEEBERGER
LEONARD J. SEABERG
INVENTORS

BY R. Frank Smith

ATTORNEY & AGENT

DONALD R. SCHNEEBERGER
LEONARD J. SEABERG
INVENTORS

ATTORNEY & AGENT

DONALD R. SCHNEEBERGER
LEONARD J. SEABERG
INVENTORS

BY

ATTORNEY & AGENT

United States Patent Office 3,476,472
Patented Nov. 4, 1969

3,476,472
STRIP RETRIEVAL DEVICE
Donald R. Schneeberger and Leonard J. Seaberg, Rochester, N.Y., assignors to Eastman Kodak Company, Rochester, N.Y., a corporation of New Jersey
Continuation of application Ser. No. 486,725, Sept. 13, 1965. This application Feb. 26, 1968, Ser. No. 708,419
Int. Cl. G03b 23/12
U.S. Cl. 353—26   30 Claims

ABSTRACT OF THE DISCLOSURE

A strip retrieval device having a mechanism for advancing a shingled array of strips to a strip selecting position. The advancing mechanism is movable from the strip selecting position to a strip separating position for separating the selected strip from the array of strips. Further movement of the advancing mechanism from the strip separating position advances the selected strip along one path and the remaining strips along different paths.

---

This application is a continuation of patent application Ser. No. 486,725, filed on Sept. 13, 1965 by Donald R. Schneeberger and Leonard J. Seaberg, entitled "Strip Retrieval Device," now abandoned.

The present invention relates to the retrieval of recorded information and more particularly to apparatus for selecting one of a number of information-bearing strips for movement through an information-retrieval plane.

It is well known to photographically record documents, drawings, maps etc. on a film strip and to encode information relating to such records either between each recorded image or along an edge of the film strip. Such photographic micro-reproduction of records is usually made on a relatively long strip of microfilm which is wound on a reel and serves to reduce by a large factor the storage needs for such records. When long strips of microfilm are used for retrieving the information recorded thereon, it may be necessary to scan a considerable length of the film strip before the desired document image can be located. If such document image is at or near the end of the reeled film strip, substantially the full length of the film strip, which could amount to 100 feet of film, must be moved through a scanning or projecting station.

In some systems only current information is desired because it must be continually up-dated. For this reason, the information is photographically recorded on short strips of film, each of which is mounted on or in a suitable holder. With this arrangement, new strips can be easily supplied and interchanged for those being used, so that the file can be readily maintained on a current basis. Such a strip system has an advantage over a reel system in that information to be deleted and/or added does not require continual cutting and splicing of a short length of film to a long length already accommodated on a reel, nor location of the position on the long length at which the correction is to be made or inserted. However, when the information to be recorded requires more than one film strip, it is then necessary to provide more than one holder, as well as means on each holder for identifying the information on the strip so that the proper holder can be selected to retrieve the desired information.

It is known in the information storage and retrieval art to store a plurality of film chips in or on a so-called "stick holder" in order to facilitate handling and using of such chips. By means of such a stick, the film chips can be positioned in various types of apparatus for selecting a discrete chip that is then projected onto a screen for viewing, projected onto a sensitized paper to make an enlarged copy, or contact printed to generate a copy of the same size. One of the disadvantages of this system is that the chips are of such a size that they are difficult to handle unless in a holder that is used in conjunction with completely automated apparatus.

The present invention comprises apparatus for receiving a number of information-bearing strips that are secured together at one end for movement as a unit and have the other ends arranged in a shingled array for the purpose of locating and separating a selected strip. Such a unit of strips is retained in a holder and slideable through an open end thereof to position a selected one of the strips in relation to a separator device. The apparatus comprises advancing means for engaging the strips when a holder is positioned on the apparatus for moving them to position the ends in a shingled array relative to the separator device and, after separation, for moving the selected strip into an information-retrieval plane, the unselected strips being moved into and through at least one other path. A selecting means provides a path of movement for the advancing means such that the number of group of strips are first moved relative to the separator means and, upon shifting of the advancing means from a first path through a second path and into another path that extends parallel to the first path, the separator device positions only the selected strip so that it can be moved through the information-retrieval plane. The apparatus also includes means for interlocking the holder and the selecting means so that the selection of a strip can only be made the holder can only be removed from the apparatus, when the advancing means is in a "home" position.

While the invention is described hereinafter with respect to moving a selected film strip into the focal plane of a projection lens system for projecting one of a number of images thereon onto a screen or a photographic paper, the strips can be of paper with photographic images that can be projected by a light reflection system rather than a light transmitting system. Also, the strips can be paper with encoded informaiton punched therein, or can be a magnetic tape with magnetically recorded information. In the latter instances, after selection, a selected strip or tape can be automatically driven at the proper speed past a punch to encode the tape, a scanning device to read the tape, or a record/play head, any one of which can, in effect, be considered as defining an information-retrieval plane corresponding to that of the focal plane of a projection lens system, in that the information is retrieved from another source and recorded on the strip or tape as input information, or is retrieved from the strip or tape for transmission or use as output information.

One object of the present invention is to provide an improved apparatus for selecting one of a number of strips for movement through an information-retrieval plane.

Another object of the invention is to provide an apparatus for selecting one of a number of information-bearing strips, whereby separation of the selected strip is effected when an advancing means is moved through a path interconnecting two spaced and parallel paths of travel therefor.

Still another object of the invention is to provide an apparatus including means for interlocking a strip holder and a strip advancing mechanism so that the former cannot be positioned on or removed from the apparatus without the latter being in a predetermined position with the strips fully contained within the holder.

Another object of the invention is to provide apparatus for selecting one of a number of information-bearing strips that is easy to operate and simple in structure.

Further objects and advantages of the present invention will become readily apparent to those skilled in the art from the following description, when read in conjunction with the accompanying drawings in which like characters represent like parts, and wherein:

FIG. 4 is a plan view of the support plate with the central portion broken away to more clearly disclose the mechanisms comprising the invention incorporated in the reader-printer shown in FIG. 1;

Figure 1:
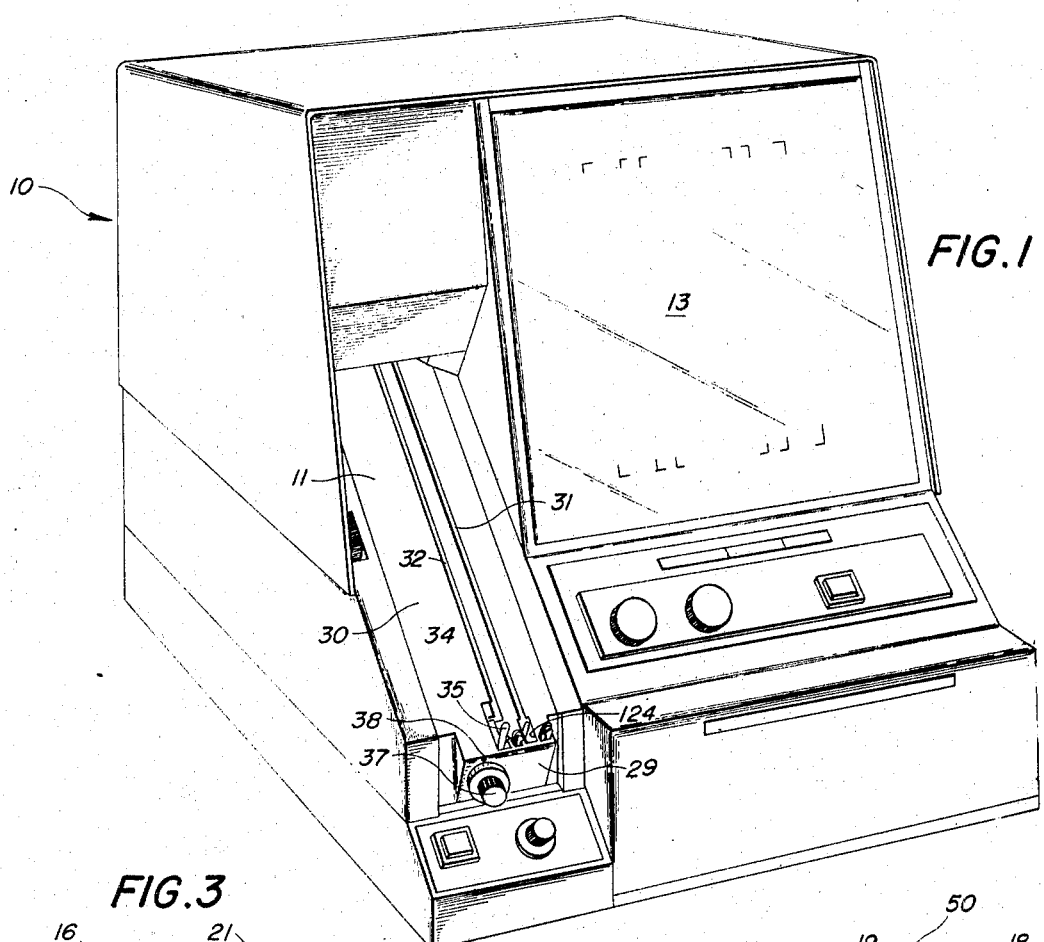
FIG. 1 is a perspective view of a reader-printer incorporating the invention.

In FIG. 1 a reader-printer 10 is shown in which a support means 11 for a holder 12 is arranged to the left of a viewing screen 13. In such a reader-printer a portion of a film strip, that is, one of the images thereon, is positioned in the focal plane of a projection lens system and by a system of mirrors, the image is directed onto the screen 13, or onto a photographic paper that is arranged within the reader-printer 10 for making a copy thereof. Inasmuch as such reader-printers are known in the art and can be similar in structure to that disclosed in U.S. Patent 3,161,105, it is believed that no further description or disclosure thereof is necessary.

Figure 3:
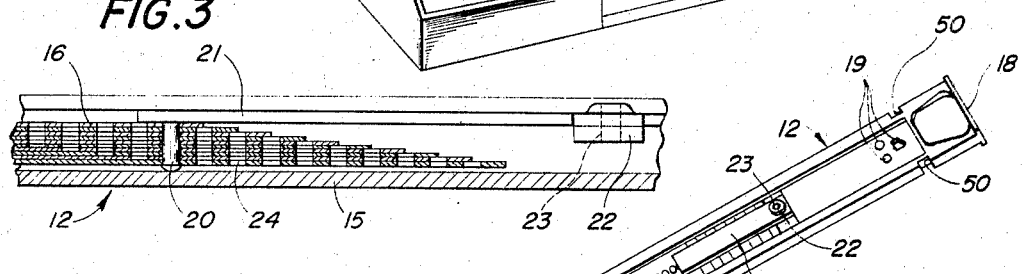
FIG. 3 is a partial longitudinal section through the holder shown in FIG. 1 showing the manner in which the strips are mounted for arranging the free ends in a shingled array.
Figure 2:
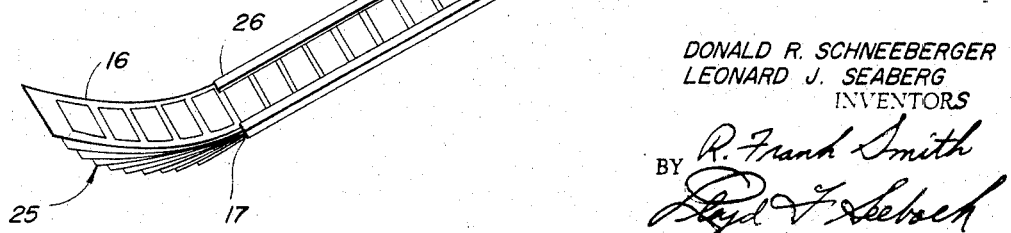
FIG. 2 is a detailed perspective view showing a holder and the manner in which a number of strips are retained therein.

With reference to FIG. 2, the holder 12 comprises a channel portion 15 for receiving a number of film strips 16 that can be slidably mounted in channel portion 15 for movement as a unit through an open end 17 thereof. The holder 12 includes a handle portion 18 to facilitate handling and positioning the holder on the support means 11 or in a suitable file. At the end of channel portion 15 adjacent the handle 16 spaced protuberances 19 are provided for a purpose to be described. A button 20 extends from one side of a guide member 21 and a button 22 that is spaced from the button 20, see FIG. 3, extends from the opposite side of the guide member 21, the button 22 having a central hole 23. Each of the strips 16 is provided at one end with a group of longitudinally-spaced holes 24 for engaging the button 20. When a number of strips 16 are assembled on member 21 for retention within holder 12, each successive strip is positioned on the button 20 with a corresponding hole 24 in engagement therewith. By this arrangement the strips 16 are effectively joined together at one end by a button 20 so as to be movable as a unit, see FIG. 3, and the ends 25 adjacent the open end 17 are arranged in a shingled array because of their arrangement on button 20, see FIG. 2. When the strips 16 are completely withdrawn into the holder 12, the button 22 is engaged by the protuberances 19, thereby retaining the strips in the holder. The sides of holder 12 at the end 26 adjacent open end 17 are tapered for a purpose to be described hereinafter.

Figure 6:
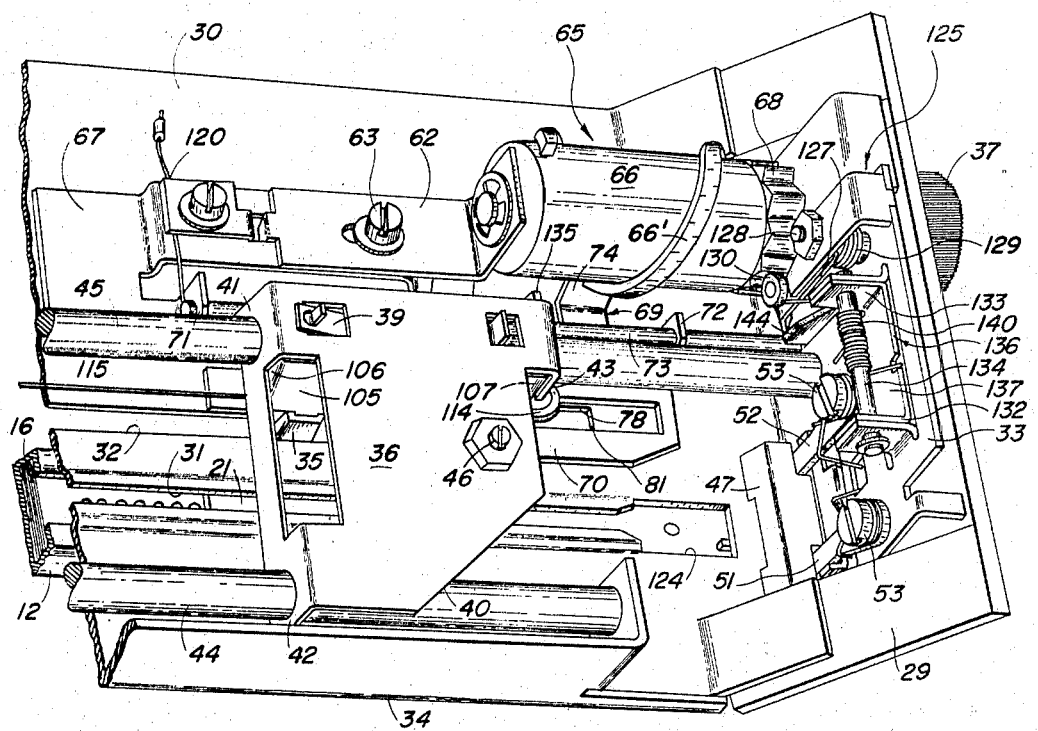
FIG. 6 is a partial perspective view of the bottom of the support plate shown in FIG. 5 and the mechanism at the forward end thereof.

The support means 11 comprises a plate 30 having longitudinal slots 31 and 32 which terminate adjacent a front face 33 of the plate, the plate 30 being formed at the front face to support a panel 29 at an angle to the top surface 34, see FIGS. 4 and 6. The plate 30 with the mechanisms to be described is secured to the front of the reader-printer at an angle substantially as shown in FIG. 1. The slot 31 permits a connection to be made by means of the button 22 between the strips 16 and a strip advancing means 36, when the holder 12 is positioned on the plate 30. The slot 32 provides a path of movement for an operating member 35 that is coupled to the advancing means 36. A selecting knob 37 is rotatably mounted on the front panel 29 for movement relative to a fixed index 38 to select a correspondingly positioned one of strips 16 for movement into an information-retrieval plane 95 by operating member 35.

Figure 7:
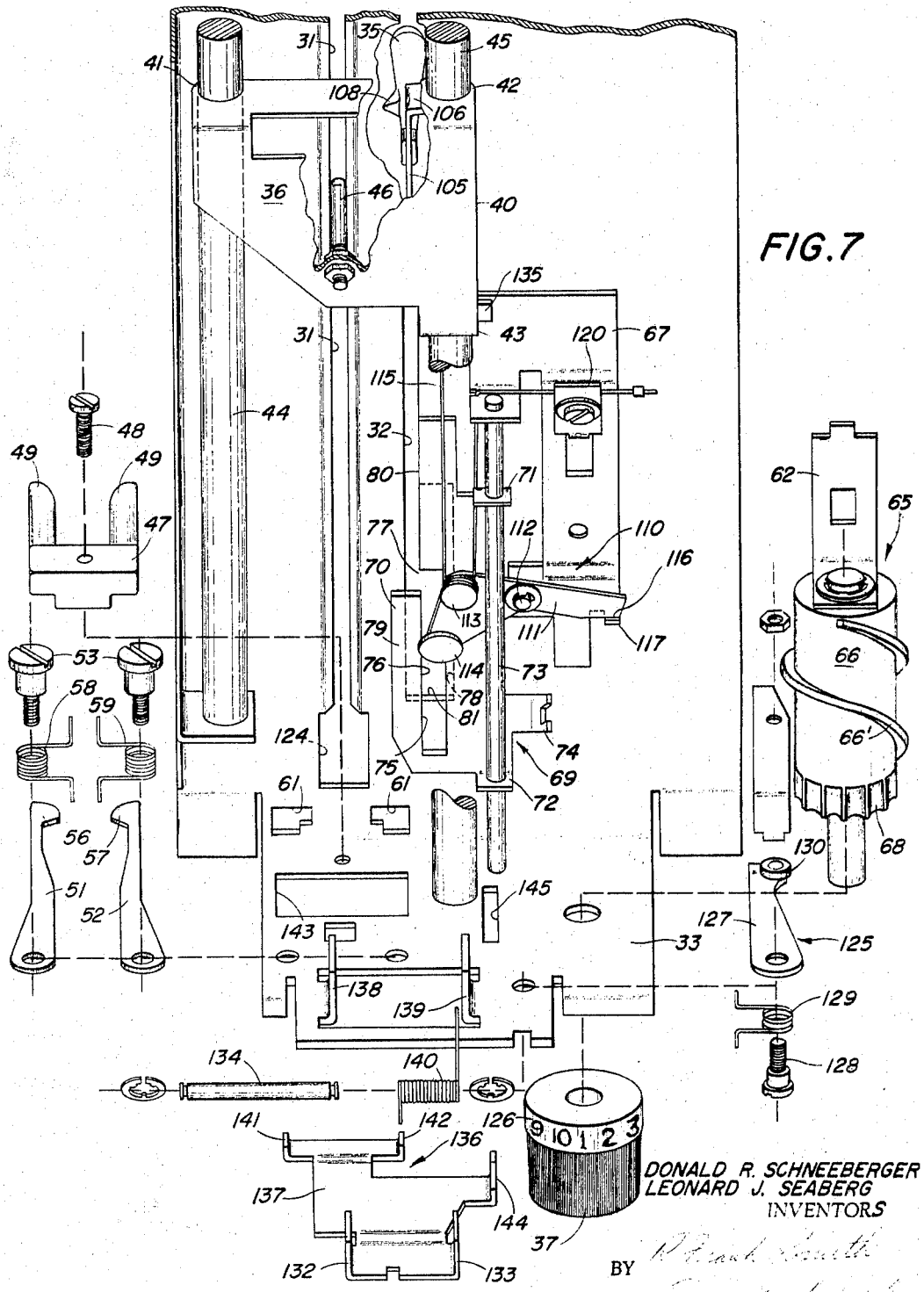
FIG. 7 is a view of the underside of the support plate with various parts shown in an exploded relation for detail and clarity.
Figure 8:
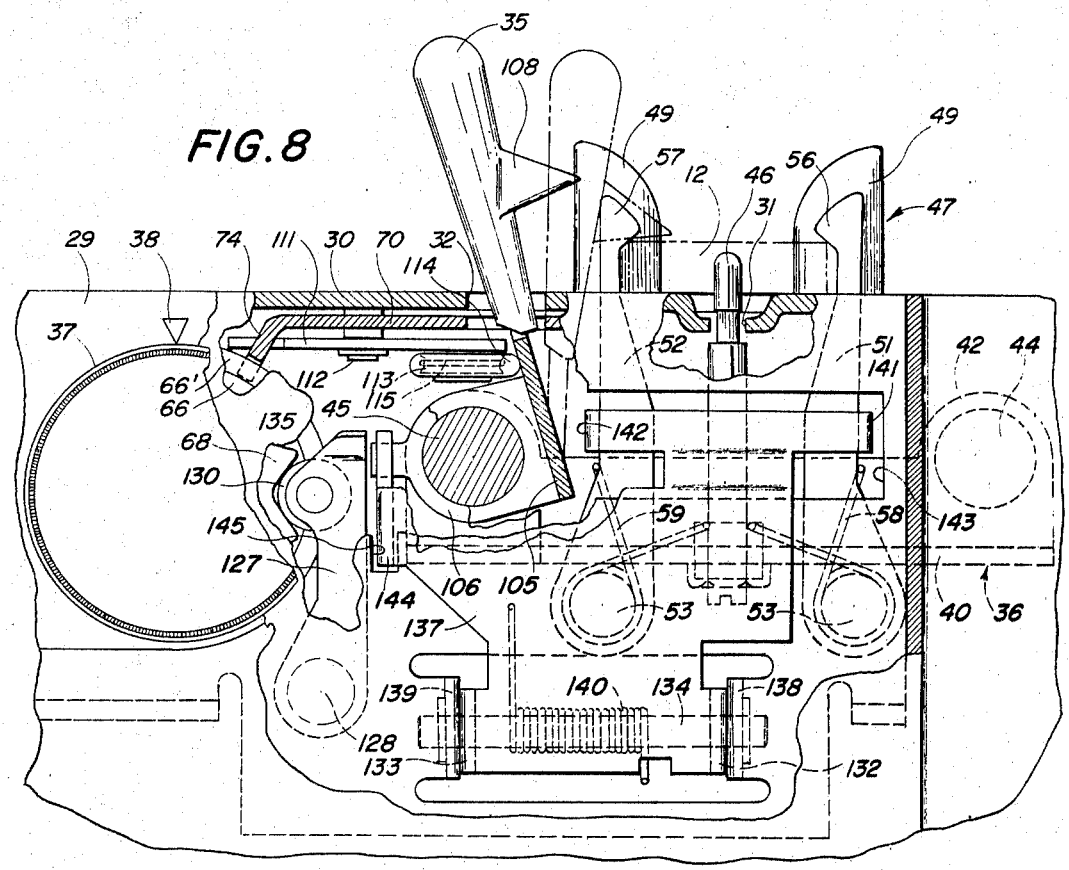
FIG. 8 is an enlarged end elevational view of the support plate and the mechanisms thereon with a portion of the front face broken away to show the operating member and interlock means.

With reference particularly to FIGS. 4, 6 and 8, the strip advancing means 36 comprises a bracket 40 having spaced ears 41, 42 and 43 which slidably engage a pair of spaced rods 44, 45 that are mounted on the underside of plate 30, a leaf spring 39 carried by bracket 40 engaging rod 45 to provide a frictional drag so the bracket can be positioned along the rods without slippage, see FIG. 6. Bracket 40 carries a pin 46 which extends into slot 31 for engaging the hole 23 in button 22, when the holder secured to the inside of face 33 by a screw 48 and is 12 is positioned on plate 30. A locating member 47 is provided with a pair of spaced projections 49 that extend through a pair of spaced apertures 61 in plate 30 for locating the holder 12 by engaging a pair of notches 50, one of which is located in each edge of the holder adjacent handle 18, see FIG. 2. A pair of holding members 51, 52 each of which is pivotally mounted on the inside surface of face 33 by means of a threaded stud 53, also extend through a respective one of apertures 61 so that noses 56, 57 thereof (see FIG. 7) can engage the top surface of the holder 12 to hold the latter on the plate 30. As described hereinafter, removal of the holder 12 is prevented during movement of the strip advancing means 36 by means that coact with the members 51 and 52 which are normally biased toward the holder 12 by their respective springs 58 and 59.

Selecting means 65 (see FIGS. 6 and 7) comprises cylindrical member 66 having a helical-ridge cam 66', the member 66 being rotatably mounted between the face 33 and an angle plate 62 that is secured by a screw 63 to a bracket 67 which, in turn, is secured to the underside of plate 30. At its forward end, the member 66 is provided with a fluted ring 68 having a number of flutes corresponding to the maximum number of strips to be contained in a holder 12. The selecting knob 37 is secured to the member 66 by a pin or key not shown so that rotation of the knob is imparted to the member 66 and the fluted ring 68.

Control means 69 (see FIGS. 6 and 7) comprises a plate 70 having spaced ears 71, 72 which slidably engage a rod 73 mounted on the underside of plate 30 between an ear 64 on bracket 67 and face 33. The plate 70 is provided with a bifurcated extension 74 which engages the helical cam 66' which moves the plate 70 along rod 73 when knob 37 is rotated. The plate 70 is provided with a right-angled cut-out 75 that forms a first path 76 and a second path 77 transverse thereto for the member 35 and co-operates with an enlarged slot portion 78 of slot 32 at the forward end thereof. With reference to FIG. 7, it will be noted that a leg 79 on the left side of cut-out 75 covers part of slot portion 78 and the part of plate 70 on the right side and above cut-out 75 overlies a part of slot portion 78. Beyond cut-out 75, an edge 80 of plate 70 is aligned with the right-hand edge of slot 32. Since plate 70 lies relatively close to the undersurface of plate 30, the cut-out 75 in conjunction with slot 32 provides a path in which the member 35 is movable, namely, a first path 76 and a second path 77 transverse thereto which connects the path 76 to slot 32, and a third path that is defined by slot 32. Upon rotation of selecting knob 37, the cam 66' moves plate 70 relative to slot portion 78 and slot 32 so that the length of the first path 76, as measured from the end 81 of slot portion 78 to the second path 77 corresponds to the distance required to move a selected strip from within the holder 12 to a position relative to a separator means 85.

Figure 9:
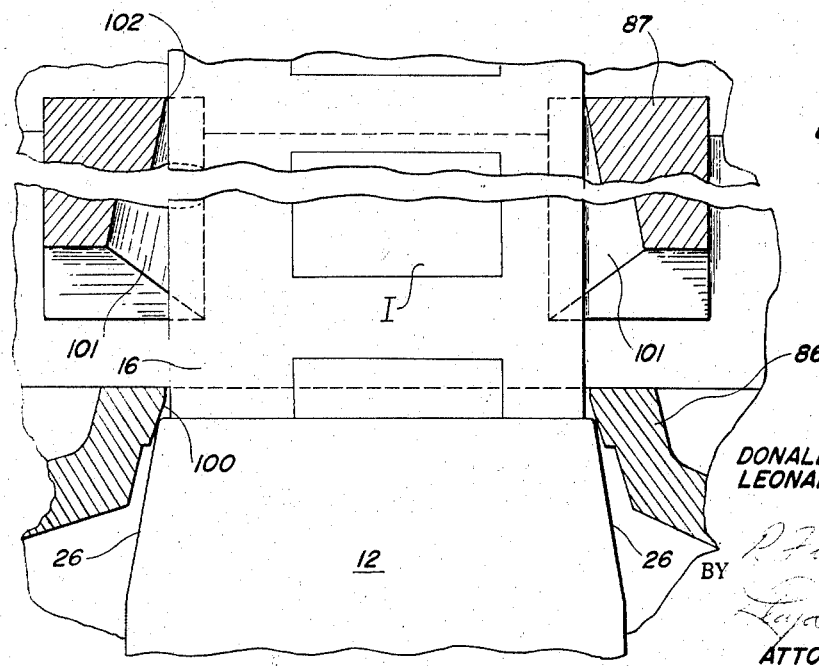
FIG. 9 is a partial horizontal, sectional view through the separator means showing the means for locating the holder relative thereto.
Figure 10:
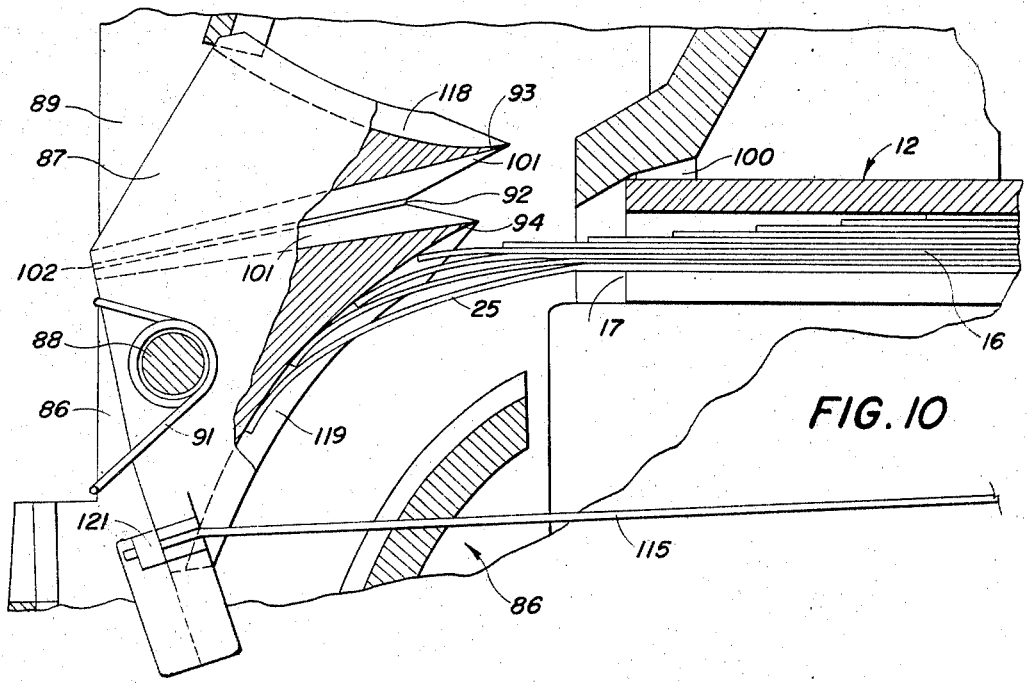
FIGS. 10 and 11 are enlarged vertical, sectional views through the separator means showing, respectively, its relation to the ends of the strips in a selecting position and in a separating position.
Figure 11:
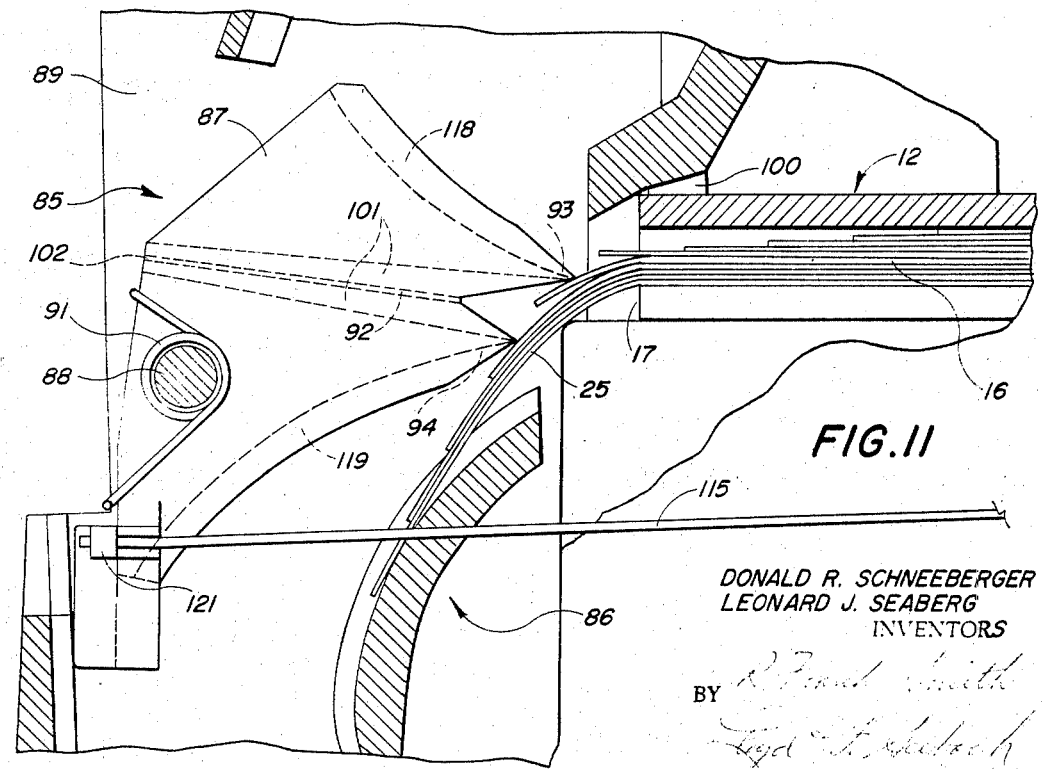

Separator means 85 is pivotally mounted on the rear end of plate 30 by means of a bracket 86, see FIGS. 4, 5, 10 and 11. The separator means comprises a member 87 that is pivotally mounted on a rod 88 that is journaled in a pair of spaced uprights 89, 90 on bracket 86. A coil spring 91 on rod 88 engages member 87 to urge it in a clockwise direction but it is retained in a position as shown in FIG. 10 by means described in detail hereinafter. The member 87 is provided with a central opening 92 which at the right-hand end, as seen in FIGS. 10 and 11, terminates in a pair of spaced lips 93, 94 which serve to separate a selected strip 16 from the group that is contained in the holder 12. The bracket 86 is provided at the forward end with a tapered throat 100, see FIG. 9, which engages the tapered end 26 of the holder 12 to locate the latter when it is positioned on plate 30. Likewise, the opening 92 in member 87 is beveled outwardly as at 101 and also tapered to the rear to provide a rear aperture 102 which accurately locates the free end of the selected strip for movement between a pair of spaced optical flats 96, 97.

Figure 5:
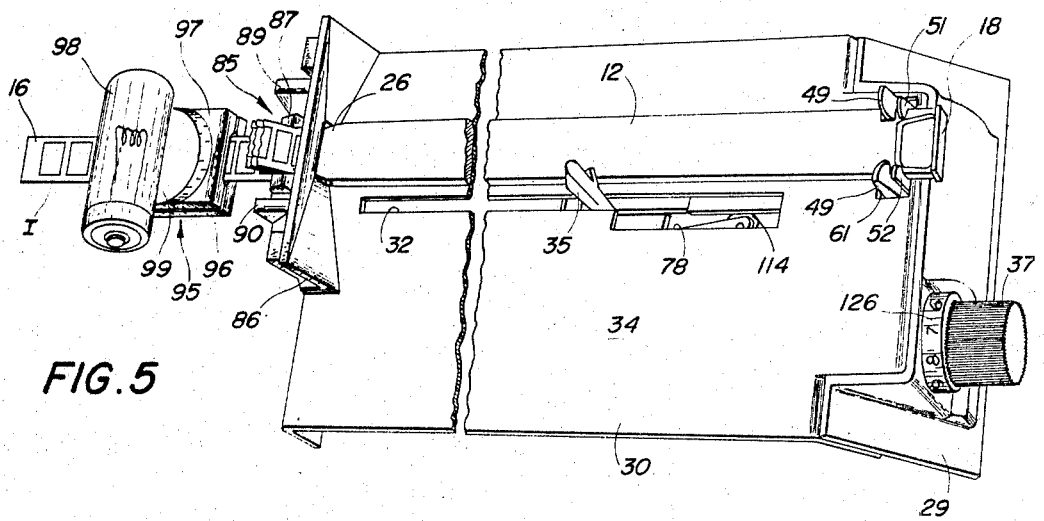
FIG. 5 is a perspective view of the support plate with the center section broken away to show the paths of movement for the advancing means, and a holder positioned thereon with a selected strip moved into the information-retrieval plane.

The separator means 85 is arranged between the open end 17 of the holder 12 and the information-retrieval plane designated by the numeral 95, see FIGS. 4 and 5. In the apparatus in combination with which the invention is being described, the information-retrieval plane 95 is the focal plane of a projection lens system that is not shown. The plane 95 is determined by the pair of optical flats 96, 97 between which the selected strip is moved for positioning one of the images I thereon in registry with the optical axis of the lens system. The image is illuminated by a light source 98 and a suitable condenser lens system 99, in a manner as is well known in the art.

The operating member 35 which extends through slot 32 is fastened to a bracket 105 that is pivotally mounted on rod 45. Bracket 105 is provided with spaced ears 106, 107 which are arranged between and in contact with ears 42 and 43 of bracket 40, see FIGS. 7 and 8. Upon movement of the member 35 in either direction through paths 76, 77 and slot 32, the advancing means 36 is moved therewith and by means of pin 46 the bracket 40 and the strips 16 are also moved into and out of holder 12. The member 35 is provided with a nose 108 that engages the holder 12 when the member 35 enters slot 32 for maintaining holder 12 against surface 34, see FIG. 8.

Actuating means 110 for operating member 35 and separator means 85 comprises a lever 111 which is pivotally mounted on bracket 67 at 112, see FIGS. 7 and 8. The lever 111 carries a pulley 113 and a freely rotatable roller 114 that normally engages the bracket 105, see FIG. 8. The pulley 113 is encircled by a cable 115 which has one end fixed to bracket 67 at 120, see FIG. 7, and the other end fixed to member 87 at 121, see FIGS. 10 and 11. With this arrangement, the position of member 87 is controlled by the position of pulley 113. Due to the spring 91 urging the member 87 in a clockwise direction, member 87 is held in a position as shown in FIG. 10 so long as the pulley 113 is at its farthest distance from the member 87. This distance is decreased when lever 111 rotates in a counterclockwise direction, as viewed in FIG. 4, and spring 91 then moves member 87 into the position shown in FIG. 11. Whenever operating member 35 is in the first path 76, roller 114 is in engagement with bracket 105 and urges operating member 35 in a clockwise direction and against the edge of a cut-out 75, as seen in FIG. 8, due to the action of spring 91 through cable 115.

When operating member 35 is moved along path 76 to a position in which it is in the second path 77, lever 111 is moved in a counterclockwise direction due to spring 91 and urges bracket 105 and operating member 35 in a clockwise direction so that the operating member is moved along the second path 77 into slot 32. The movement of lever 111 is arrested by an end 116 thereof engaging a stop lug 117 on bracket 67.

With this movement of lever 111, a shorter distance is established between pulley 113 and member 87 so that the spring 91 moves the member 87 in a clockwise direction to a position as shown in FIG. 11. During this movement of member 87, the lip 93 engages a surface of the selected strip 16, whereas the lip 94 engages a surface of the next and immediately adjacent strip 16. The member 87 is provided with guide surfaces 118 and 119 for directing the unselected strips above and below the selected strip into paths that diverge and are different from that of the selected strip. As will be more fully described hereafter, if the first or the last strip in a group is the one to be selected, all of the remaining or unselected strips are then directed in only one direction.

A detent device 125, see FIGS. 7 and 8, is provided for engaging the fluted ring 68 to hold the control means 69 in a fixed position relative to slot 32 in accordance with the selected strip during the separation thereof and the movement of the strips into and out of holder 12. As stated above, the number of flutes in ring 68 corresponds to a number scale 126 provided on knob 37 and to the maximum number of strips that can be contained in a holder 12. In order to make a selection, it is necessary that the advancing means 36 be positioned in a "home" or selecting position which is immediately adjacent the front face 33 of plate 30 with the pin 46 in the enlarged end portion 124 of slot 31. The detent device 125 comprises a lever 127 that is pivotally mounted on the inner side of face 33 by means of a threaded stud 128 and carries a roller 130 that is urged against the fluted ring 68 by a spring 129 so that the roller 130 can ride in and out of the flutes.

In the "home" position of the strip advancing means 36, an extension 135 on bracket 40 engages an interlock device 136, see FIGS. 6–8, which comprises a plate 137 that is pivotally mounted by means of a pair of spaced ears 132, 133 on a rod 134 that is journaled in a pair of spaced supports 138–9 formed inwardly from the face 33, the plate 137 being urged toward the advancing means 36 by a spring 140 on rod 134. A pair of spaced lugs 141, 142 extend through an opening 143 in face 33, to engage the holding members 51 and 52. A lug 144 that extends through an opening 145 in face 33 is positioned in the path of extension 135. When the bracket 40 is in the "home" or selecting position, the extension 135 is in engagement with the lug 144 and urges the plate 137 in a direction such that lug 144 is free of detent device 125 and lugs 141, 142 are retracted from members 51 and 52.

In order to understand the operation of the invention and co-operating relationship of the various parts and mechanisms included therein, it is believed best to describe a complete selection operation now that the individual elements and mechanisms have been identified. As stated above, in order to make a selection the strip advancing means 36 must be in a "home" or selecting position with bracket 40 adjacent the front face 33 so that the extension 135 is holding the interlock device 136 in a position such that the detent device 125 and the holding members 51 and 52 are free. A holder 12 is positioned on plate 30 with the open end 17 positioned in the throat 100 adjacent the separator means 85. The holder is positioned with the open face facing plate 30 and with the guide member 21 positioned so that protruberances 19 are engaging button 22, that is, with the strips 16 entirely contained within holder 12.

When the holder is positioned on the surface 34 of plate 30, the projections 49 on member 47 engage the notches 50, and the holding members 51, 52 are spread apart and then return to a position in which the noses 56 and 57 engage the holder in the vicinity of handle 18, see FIG. 5. When the holder 12 is so positioned on plate 30, the button 22 engages the pin 46 on bracket 40.

After the holder 12 has been so positioned and since the interlock device 136 is still in a position so that it is not blocking the detent device 125, knob 37 can be rotated to make a selection. It should be pointed out at this point that it is not necessary for the knob 37 to be in a zero, or any other predetermined position, to make a selection. As will be apparent from the description which follows, knob 37 can be rotated in either direction irrespective of any previous selection that may have been made. Upon rotating knob 37 in either direction, cam 66' through follower extension 74 moves plate 70 along slot 32 so as to position the second path 77 relative to slot 32. At this time, operating member 35 is at the front end 81 of enlarged portion 78 adjacent face 33. The second path 77 is therefore located by knob 37 relative to slot 32 in accordance with the distance of the selected strip within the holder 12 from the separator means 85. Member 35 is then moved through the first path 76 until it abuts the end thereof, in which position it is at one end of the second path 77. As the operating member 35 is first moved along path 76, extension 135 is removed from extension 144 and the interlock device 136 then becomes operative. With further movement of operating member 35, spring 140 urges the plate 137 into a position in which lugs 141 and 142 engage holding members 51 and 52, respectively, to prevent their being moved or spread in a direction so as to remove the holder 12. Also, the lug 144 then assumes a position alongside lever 127 so that the roller 130 is held in the flute corresponding to the selected strip number, thereby inhibiting rotation of selecting knob 37.

When operating member 35 is aligned with the second path 77, the actuating means 110 moves the operating member 35 through the second path 77 and into slot 32. As this occurs, the roller 114 follows bracket 105, lever 111 moves in a counterclockwise direction (FIG. 4) and pulley 113 moves toward the separator means 85, due to spring 91 so that member 87 can then move toward the film strips. Also, the nose 108 engages the holder 12 to hold it against surface 34 as member 35 is moved along slot 32. As member 35 is moved in the first path 76, the bracket 40 is moved therewith and since the strips 16 are engaged by the pin 46 by means of button 22, the strips are moved as a unit towards separating means 85. Movement of the strips is temporarily halted as operating member 35 moves through the second path 77 and into slot 32.

Since the operating member 35 is, in effect, controlling separation of the selected strip, the separation is actually made during the interval that the operating member 35 moves from the first path 76 through the second path 77 and into slot 32. When the member 87 is urged in a clockwise direction by spring 91, the lips 93, 94 automatically perform the separating operation. Then, upon further movement of the operating member 35 along the slot 32, the selected strip 16 is moved through opening 92 and between the optical flats 96, 97 while the unselected strips are moved along guide surfaces 118 and/or 119 depending on the number of the selected strip. The distance that operating member 35 moves along slot 32 will depend on the location of the desired image I on the selected strip and so long as a strip has been selected and separated it can be moved back and forth through the information-retrieval plane to locate any one of the images I relative to the axis of the optical system. When the direction of movement of the operating member 35 is reversed to return the strips to the holder 12, the member 35 is moved along slot 32 until it abuts the end of leg 79. The operating member 35 must then be urged through the second path 77 and, as this is done, the roller 114 is engaged by bracket 105, thereby pivoting the lever 111 in a clockwise direction (FIG. 4) and increasing the distance between the member 87 and the pulley 113 so that the member 87 is returned to the position shown in FIG. 10. The strips 16 are then completely returned within the holder 12 as the operating member 35 is moved along the first path 76 toward edge 81. As the operating member approaches the end of the first path 76, the extension 135 on plate 40 engages lug 144 on plate 137, thereby pivoting the interlocking device 136 so that the detent device 125 and the holding members 51, 52 are free to be moved. With the strips 16 returned to the holder 12 and the detent device 125 free, another strip can be selected merely by rotating the knob 37 in either direction until the proper number on scale 126 is aligned with index 38. To remove the holder 12, the holding members 51, 52 are urged apart and the holder raised by means of the handle portion 18 for withdrawal from the pin 46 and the plate 30.

From the above description of the invention, the selection of a strip 16 as well as its movement through the information-retrieval plane 95 is accomplished manually by the operator. However, when strips 16 are of paper or are lengths of magnetic tapes, the advancing means 36 can be coupled to a motor drive as operating member 35 moves into slot 32 so that the strips or tapes can then be moved at the requisite speed for recording information on or retrieving information from the selected strip or tape as it is moved past a punch mechanism, a scanning means, or a record/play head. By means of directional and limitation controls, the motor drive can be reversed for returning the strips into the holder 12 upon completion of each recording or retrieving operation. Also, means can be provided whereby a strip or tape can be selected on a random or sequential basis.

The invention has been described in detail with particular reference to perferred embodiments thereof, but it will be understood that variations and modifications can be effected within the spirit and scope of the invention as described hereinabove.

We claim:

1. Apparatus for receiving a number of strips which are secured together at one end thereof for movement as a unit and have the other ends thereof arranged in a shingled array for separating a selected one of said strips for movement in an operational path that is distinct from the path of said unselected strips, comprising in combination:

support means on said apparatus for receiving and maintaining said strips in a position parallel to and adjacent a slot in said support means with said other ends spaced from said operational path;

separator means arranged between the other ends of said strips and said operational path and movable from a static first position into a second position for directing said selected strip into said operational path;

advancing means reciprocally movable between a strip-selecting position and a strip-moving position and including a first member for engaging the one end of said strips and a second member movable in a first path parallel to the length of said strips for moving the latter to position said selected strip in the path of movement of said separator means, in a second path perpendicular to said first path, and in a third path defined by said slot for moving said selected strip through said operational path;

control means movable along said slot and including a control member co-operating with said slot to establish the length of said first path and the location of said second path, the latter connecting said first path and said slot;

selecting means coupled to said control means for moving said control member along said slot and into a position in which the length of said first path corresponds substantially to the distance of the other end of said selected strip from said separator means; and actuating means engaging said second member and coupled to said separator means for holding the latter in said first position and for urging said second member, when the latter is substantially aligned with said second path, from said first path through said second path and into said slot, said separator means being released for movement into said second position as said second member is being moved through said second path.

2. Apparatus is accordance with claim 1 and including interlocking means for engaging and disengaging said selecting means when said advancing means is moved out of and into said selecting position.

3. Apparatus in accordance with claim 1 wherein said support means comprises a plate on which said strips are positioned and means for locating said strips relative to said slot.

4. Apparatus in accordance with claim 1 wherein said separator means comprises a pivotal member having a central opening through which said selected strip is moved and directed to said operational path, said opening terminating at the end adjacent the other ends of said strips in a pair of separating lips that are offset with respect to each other in a direction opposed to that of said shingled array.

5. Apparatus in accordance with claim 1 wherein said advancing means comprises a slide member reciprocally movable in directions corresponding substantially to the length of said strips and between a strip-selecting position and a strip-moving position, a member on said slide member for releasably engaging said strips at said one end thereof, and an operating member pivotally mounted on said slide member and movable in said first path for moving said strips into the path of movement of said separator means, in said second path, and in said slot for moving said selected strip through said operational plane.

6. Apparatus in accordance with claim 1 wherein said control means comprises a slide member having an L-shaped opening that co-operates with said slot to provide with said slot a zig-zag path for movement of said second member, the leg of said L-shaped opening providing said first path and the extension providing said second path for connecting said first path and said slot.

7. Apparatus in accordance with claim 1 wherein said selecting means comprises a rotatable helical cam coupled to said control member for moving the latter along said slot to locate said second path so that the length of said first path corresponds substantially to the distance of the end portion of said selected strip from said separator means.

8. Apparatus in accordance with claim 1 wherein said actuating means comprises a pivotal lever that is biased into engagement with said second member, a pulley on said lever, and a cable that engages said pulley and has one end fixed to said separator means and the other end fixed to said support means, said separator means being maintained in said first position so long as said second member is in said first path.

9. A apparauts for receiving a holder containing a number of information-bearing strips which are secured together at one end thereof for movement as a unit through an open end of said holder and have the other ends thereof adjacent said open end arranged in a shingled array for separating a selected one of said strips for movement through an information-retrieval plane, comprising in combination:

support means on said apparatus for receiving and maintaining said holder in a position parallel to and adjacent a slot in said support means with said open end spaced from said information-retrieval plane;

separator means arranged between the open end of said holder and said information-retrieval plane and movable from a static first position into a second position for directing said selected strip into said information-retrieval plane and the unselected strips in at least one direction away from said selected strip;

advancing means reciprocally movable into and out of a strip-selecting position including a first member for engaging the one end of said strips, when in said selecting position, and a second member movable in a first path spaced from and parallel to the length of said holder for moving said strips into the path of movement of said separator means, in a second path perpendicular to said first path, and in a third path defined by said slot for moving said selected strip through said information-retrieval plane and said unselected strips in said one direction;

control means movable along said slot and including a control member co-operating with said slot to establish the length of said first path and the location of said second path, the latter connecting said first path and said slot;

selecting means coupled to said control means for moving said second member along said slot and into a position in which the length of said first path corresponds substantially to the distance of the other end of said selected strip from said separator means; and actuating means engaging said second member and coupled to said separator means for holding the latter in said first position and for urging said second member, when the latter is substantially aligned with said second path, from said first path through said second path and into said slot, said separator means being released for movement into said second position as said second member is being moved through said second path.

10. Apparatus in accordance with claim 9 including interlocking means responsive to movement of said advancing means out of said selecting position for engaging and retaining said holder on said support means and for engaging said selecting means to inhibit movement thereof, and to movement of said advancing means into said selecting position for releasing said holder and said selecting means.

11. Apparatus in accordance with claim 9 wherein said support means includes means for locating said holder relative to said slot.

12. Apparatus in accordance with claim 9 wherein said separator means comprises a pivotal member having a central opening through which said selected strip is moved and directed to said information-retrieval plane, said opening terminating at the end adjacent the other ends of said strips in a pair of separating lips that are offset with respect to each other in a direction opposed to that of said shingled array.

13. Apparatus in accordance with claim 9 wherein said advancing means comprises a slide member reciprocally movable in a direction corresponding substantially to the length of said holder and between a selecting position and a strip-moving position, a member on said slide member for releasably engaging said strips at said one end thereof, and an operating member pivotally mounted on said slide member and movable in said first path for moving said strips into the path of movement of said separator means, in said second path, and in said slot for moving said selected strip through said informational-retrieval plane and said unselected strips in said one direction.

14. Apparatus in accordance with claim 13 wherein said operating member includes a hold-down member movable into engagement with said holder when said operating member is moved into and along said slot.

15. Apparatus in accordance with claim 9 wherein said control means comprises a slide member having an L-shaped opening that co-operates with said slot to provide with the latter a zig-zag path for movement of said second member, the leg of said L-shaped opening providing said first path and the extension providing said second path for connecting said first path and said slot.

16. Apparatus in accordance with claim 9 wherein said selecting means comprises a rotatable helical cam coupled to said control member for moving the latter along said slot to establish the location of said second path in relation to the selecting position of said advancing means so that the length of said first path corresponds substantially to the distance of the end portion of said selected strip from said separator means.

17. Apparatus in accordance with claim 9 wherein said actuating means comprises a pivotal lever that is biased into engagement with said second member, a pulley on said lever, and a cable that engages said pulley and has one end fixed to said separator means and the other end fixed to said support means, said separator means being maintained in said first position so long as said second member is in said first path.

18. Apparatus for receiving a holder containing a number of image-bearing strips which are secured together at one end thereof for movement as a unit through an open end of said holder and have the other ends thereof adjacent said open end arranged in a shingled array for separating a selected one of said strips for movement through the focal plane of a projection lens system, comprising in combination:

support means on said apparatus for receiving and maintaining said holder in a position parallel to and adjacent a slot in said support means with said open end spaced from said lens system;

separator means arranged between the open end of said holder and said lens system and biased for movement between a static first position and a second position for engaging a surface of a selected strip for directing said selected strip into said focal plane and the unselected strips in at least one direction away from said selected strip;

advancing means slidably mounted on said support means for movement into and out of a strip-selecting position and including a first member for engaging the one end of said strips, when said advancing means is in said selecting position, and a manually-actuated operating member movable in a first path spaced from and parallel to the length of said holder for moving said strips into the path of movement of said separator means, in a second path perpendicular to said first path, and in a third path defined by said slot for moving said selected strip through said focal plane and said unselected strips in said one direction;

a control member slidable and reciprocally mounted on said support means for movement along said slot and provided with an opening that co-operates with said slot for establishing the length of said first path and the location of said second path, the latter connecting said first path and said slot;

a helical cam rotatably mounted on said support means and coupled to said control member for moving the latter to establish the location of said second path in relation to the selecting position of said advancing means so that the length of said first path corresponds substantially to the distance of the other end of said selected strip from said separator means; and an actuating means engaging said operating member and coupled to said separator means for holding the latter in said first position and for urging said operating member, when the latter is substantially aligned with said second path, from said first path through said second path and into said slot, said separator means being released for movement into said second position as said operating member is being moved in one direction through said second path and into said first position as said operating member is being moved in the other direction through said second path.

19. Apparatus in accordance with claim 18 including an interlocking means comprising a pair of retaining members pivotably mounted on said support means for releasably engaging said holder, when the latter is positioned thereon, a detent device pivotally mounted on said support means for releasably engaging said cam to inhibit rotation thereof, and an interlock member pivotably mounted on said support means and releasably engaging said retaining members and said detent device for inhibiting movement thereof when said advancing means is moved out of said selecting position and movable into a position by said advancing means, when the latter is moved into said selection position, for releasing said retaining members and said detent device.

20. Apparatus in accordance with claim 18 wherein said separator means comprises a pivotal member having a central opening through which said selected strip is moved and directed to said focal plane, said opening terminating at the end adjacent the other ends of said strips in a pair of separating lips that are offset with respect to each other in a direction opposed to that of said shingled array.

21. In an apparatus for retrieving a predetermined chip from a plurality of similar chips arranged in a shingled array such that an end portion of each chip in said array is exposed, the combination comprising:

advancing means for said array movable along a transport path to a selected first position at which said advancing means is stopped and in which the exposed end portion of a predetermined chip of said array is positioned for separation from said array;

separator means movable relative to said positioned array at said first position of said advancing means to an operative position for separating said predetermined chip from the remaining chips in said array and for guiding said predetermined chip along a path of retrieval separate from the remaining chips in said array upon further movement of said advancing means along said transport path from said first position; and means coupling said advancing means to said separator means, said coupling means being responsive to movement of said advancing means at said first position for moving said separator means to said operative position.

22. The invention according to claim 21 wherein said advancing means is connected to said array and is movable (1) in a first direction to said first position, (2) in a second direction different from said first direction while at said first position for allowing movement of said separator means to its operative position, and (3) in said first direction from said first position for directing said predetermined chip along a path of retrieval separate from the remaining chips.

23. The invention according to claim 22 wherein said second direction is substantially perpendicular to said first direction.

24. The invention according to claim 21 wherein said advancing means comprises a pivotal member connected to said array and movable in a first direction to said first position, and said interconnecting means comprises a linkage interconnecting said member and said separator means for imparting pivotal movement to said member in a second direction transverse to said first direction while at said first position, and for allowing movement of said separator means to its operative position, said member further being movable in said first direction from said first position for moving said predetermined chip along said retrieval path.

25. The invention according to claim 24 wherein said linkage comprises a pivotal lever, means for biasing said lever into engagement with said member, and a cable connecting said lever to said separator means.

26. The invention according to claim 21 and further including control means for said advancing means for adjusting said first position depending upon which chip of said plurality of chips is to be retrieved.

27. The invention according to claim 21 and further including control means for said advancing means for adjusting said first position depending upon which chip of said plurality of chips is to be retrieved, said control means comprising an adjustable stop member in said path.

28. The invention according to claim 21 and further including control means for said advancing means for guiding movement of said advancing means along a zig-zag path including a first path, a second path transverse thereto and a third path parallel to said first path, said control means further having an adjustable stop member in said first path for adjusting said first position.

29. The invention according to claim 28 wherein said control means comprises an adjustably movable plate, said plate having a first slot therein for providing said first path, a shoulder adjacent the free end of said first slot to provide said stop member, and in combination with said stop member defining said second transverse path, said control means further including a housing having a second slot parallel to and laterally spaced from said first slot, said second path interconnecting said first and second paths.

30. In an apparatus for retrieving a predetermined chip from a plurality of similar chips arranged in a shingled array such that an end portion of each chip in said array is exposed, the combination comprising:

advancing means for said array movable along a transport path to a first position at which the advancing means is stopped and in which the exposed end portion of a predetermined chip of said array is positioned for separation from said array;

separator means movable relative to said positioned array at said first position of said advancing means to an operative position for intercepting said positioned array, for deflecting said similar chips in said positioned array away from said predetermined chip, and for guiding said predetermined chip along a path of retrieval separate from the remaining chips in said positioned array upon further movement of said advancing means along said transport path from said first position; and means coupling said advancing means to said separator means, said coupling means being responsive to movement of said advancing means at said first position for moving said separator means to said operative position.

References Cited

UNITED STATES PATENTS

| 3,161,105 | 12/1964 | Offensend | 40—106.1 X |
| 3,183,765 | 5/1965 | Offensend | 88—24 |
| 3,343,149 | 9/1967 | Bleiman | 129—16.1 X |

M. HENSON WOOD, JR., Primary Examiner

R. A. SCHACHER, Assistant Examiner

U.S. Cl. X.R.

40—106.1; 209—73